United States Patent [19]
Domeier

[11] Patent Number: 5,161,771
[45] Date of Patent: Nov. 10, 1992

[54] AMPLIFIER OR SPEAKER SUPPORT COMBINATION

[76] Inventor: Peter F. Domeier, 440 Webster, NW., Grand Rapids, Mich. 49504

[21] Appl. No.: 744,321

[22] Filed: Aug. 13, 1991

[51] Int. Cl.⁵ .............................................. A47F 7/00
[52] U.S. Cl. .................................. 248/676; 248/176; 248/346
[58] Field of Search ............... 248/676, 309.1, 176, 248/346, 459, 463, 465

[56] References Cited

U.S. PATENT DOCUMENTS

| | | | |
|---|---|---|---|
| 875,220 | 12/1907 | Smith | 248/465 |
| 1,236,355 | 8/1917 | Ratto | |
| 2,401,811 | 6/1946 | Atticks | 120/28 |
| 2,612,865 | 10/1952 | Macaulay et al. | 120/28 |
| 4,238,101 | 12/1980 | Kaye | 248/346 X |
| 4,296,946 | 10/1981 | Larre et al. | 281/45 |
| 4,943,021 | 7/1990 | Cien et al. | 248/176 X |

Primary Examiner—Robert W. Gibson, Jr.
Attorney, Agent, or Firm—Price, Heneveld, Cooper, DeWitt & Litton

[57] ABSTRACT

An audio speaker housing and support combination having a three point, triangular support, two of which points are at the ends of an elongated bottom edge of the housing when tilted, and the third point being on the lower end of one leg of a two legged brace, the legs of which diverge from each other, one engaging the back of the housing and having a flange beneath the housing edge.

2 Claims, 2 Drawing Sheets

AMPLIFIER OR SPEAKER SUPPORT COMBINATION

BACKGROUND OF THE INVENTION

This invention relates to an audio amplifier or speaker housing and triangular support combination.

Small musical groups which play for various special social and celebrative gatherings typically employ portable amplifier and speaker housings. The output of such devices is through the front face, typically. It has been found that the acoustical effects are greatly improved if the housing is tilted backwardly on an angle so that the output face is oriented upwardly and outwardly. What has been needed is a device which could be combined with the housing to enable this orientation, yet be simple, lightweight, compact, relatively inexpensive to fabricate, easily set up and easily removed.

SUMMARY OF THE INVENTION

An object of this invention is to provide a combination support for a speaker and amplifier housing employing the housing itself to form two legs of a triangular support to effect optimum acoustical orientation of the housing. The housing comprises, in combination with a removable component, a triangular support with one leg of the removable component constituting the third point. More specifically, the third point is achieved by the lower end of a diagonal leg of a divergent leg support, the other leg engaging the back of the housing.

These and other objects, advantages and features of the invention will become apparent upon studying the following specification in conjunction with the drawings

DESCRIPTION OF THE PREFERRED EMBODIMENT

Figure 3:
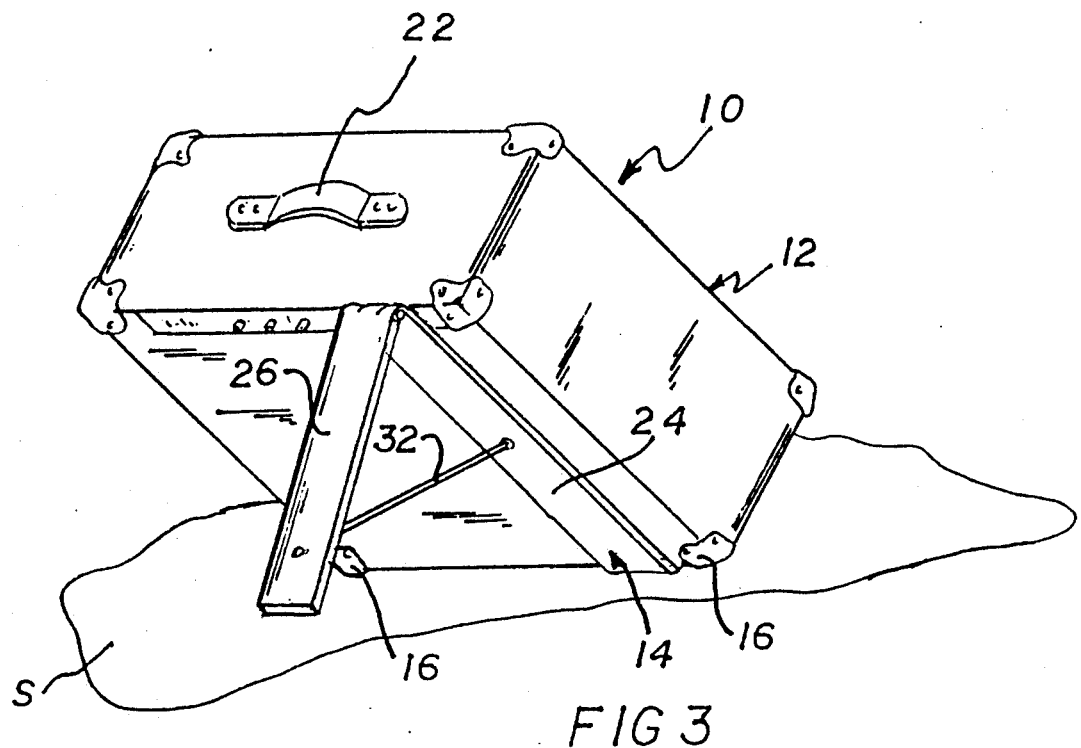
FIG. 3 is a perspective view of the combination housing and support.
Figure 4:
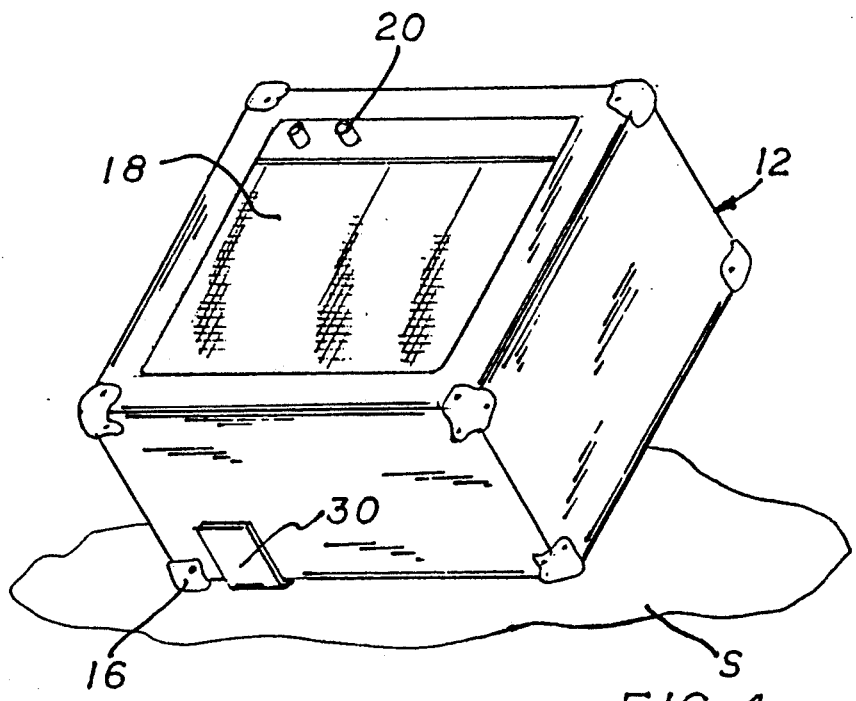
FIG. 4 is a perspective view of the front of the assembly in FIG. 3.

Referring now specifically to the drawings, the complete combination speaker and support assembly 10 (FIGS. 3 and 4) comprises a speaker housing 12 and a support subassembly 14. Speaker or amplifier housing 12 constitutes a parallelopiped having a rectangular cross sectional configuration, normally with protruding corner protecting and assembling projections 16 on each corner. The four projections 16 on the bottom corners serve as feet for the housing when it is positioned in an upright orientation. The front face of housing 12 includes a grid 18 over speaker cones (not shown), the output of the unit being controlled by control elements 20 on the face of the housing. These corner elements normally project away from the body of housing 12 a fraction of an inch, e.g., about one-eighth inch or so. Cabinet 12 is portable, typically including a handle 22 on the top thereof. This housing is combined with support subassembly 14 to support the housing in a tilted back, angular orientation on surface S. Subassembly 14 comprises a pair of legs, namely longer leg 24 and shorter leg 26 interconnected with a hinge 28 at the ends of the legs. Longer leg 24 has a lip or flange 30 projecting generally normal thereto. Extending between the legs intermediate their ends is a flexible tension tie 32 to limit he divergent positioning of the two legs relative to each other to an angle which is less than about 90 degrees or so, preferably about 45 degrees. The bottom end 26' of leg 26 forms the third point of a triangle support in combination with the housing. More specifically, the two back, lower connectors 16 of housing 12 form two points of a triangular support, with lower end 26' of legs 26 forming the third point when the two subassemblies are combined in the fashion depicted in FIGS. 3 and 4. Specifically, housing 12 is placed to have its back surface rest against the front face of leg 24, the flange 30 extending around the corner of the housing and engaging its bottom surface as depicted in FIG. 4.

Figure 1:
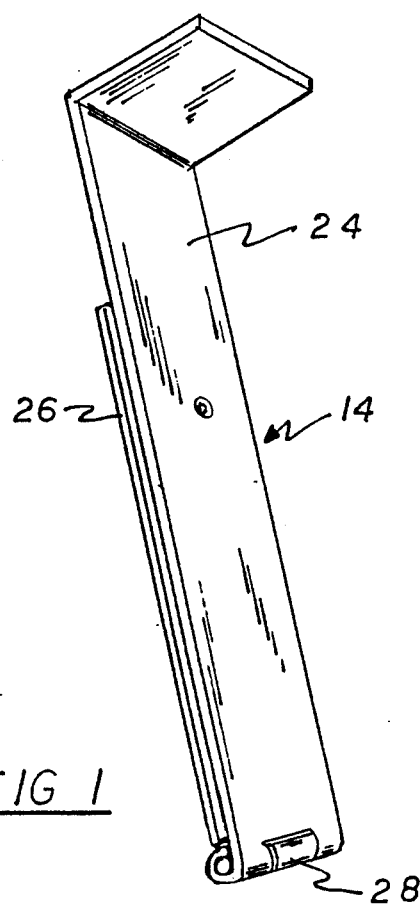
FIG. 1 is a perspective view of a support member forming part of the novel combination.
Figure 2:
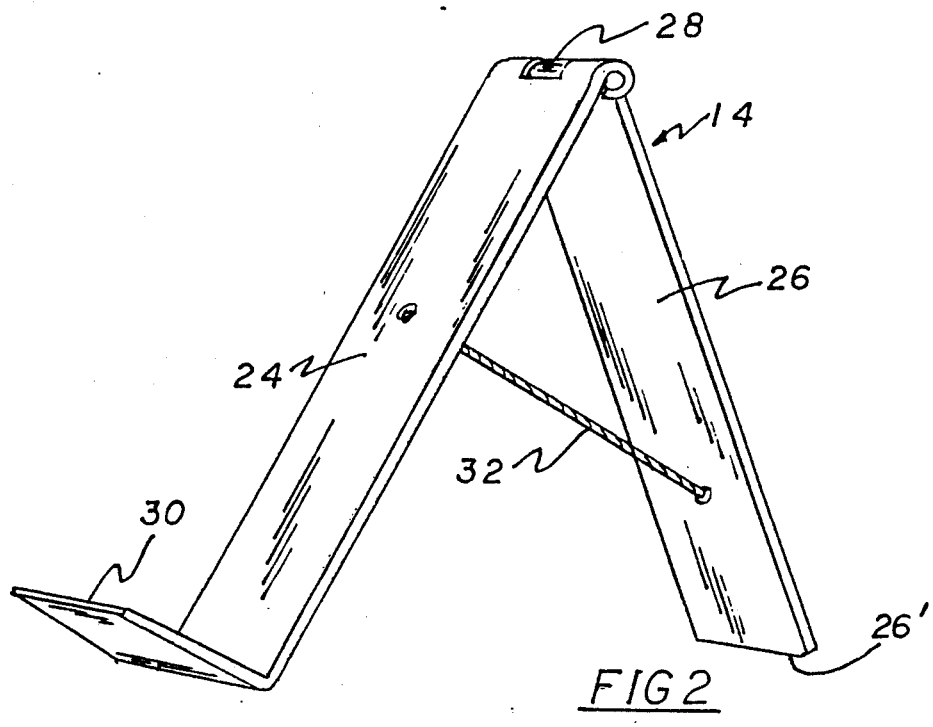
FIG. 2 is a perspective elevational view of the element in FIG. 1, shown extended.

Subassembly 14 can normally be carried in a compact, folded, position depicted in FIG. 1, along with housing 12. Upon arriving at the location for the activity, subassembly 14 is extended to the condition illustrated in FIG. 2, engaged with the back surface of a tilted housing 12, and placed on the support surface S such as a floor. Without housing 12, subassembly 14 tends to fall over sideways. Without subassembly 14, housing 12 will, if placed in the tilted orientation, fall backwardly. The interconnection of the two components stabilizes both as an assembly.

Support 14 is preferably made of metal having a thickness of approximately three-thirty-seconds of an inch or so.

It is conceivable that certain minor details of the construction may be altered to suit a particular circumstance. The invention is intended to be limited only by the appended claims and the reasonably equivalent structures to those defined therein.

The embodiments of the invention in which an exclusive property or privilege is claimed are defined as follows.

1. An amplifier or speaker housing and support combination comprising a housing having a front, back bottom, top, and a pair of end walls;

an elongated juncture edge between said bottom wall and said back wall, the ends of said edge being adjacent said end walls to form two points of a support triangle with said housing when tilted backwardly on said edge;

a triangular support cooperative with said tilted housing;

said support comprising a generally vertical leg having an upper end, a diagonal leg having an upper end pivotally hinged to said upper end of said generally vertical leg, and a tension element between said legs;

said diagonal leg having a width which is small compared to said housing, and abutting said housing back wall;

said diagonal leg having a diagonally upwardly extending flange at the bottom thereof, normal to said diagonal leg and extending beneath said edge to abut said housing bottom; and said vertical leg having a lower support-surface-abutting end forming the third point of the support triangle with said ends of said housing edge, said third point being spaced from said edge to cause said housing to be functionally positioned at an angle resting on said three points.

2. The amplifier or speaker housing and support in claim 1 wherein said ends of said edge having corner plates which protrude from said housing to form said two points of a support triangle.

* * * * *